US011893629B1

(12) United States Patent
Langley et al.

(10) Patent No.: US 11,893,629 B1
(45) Date of Patent: *Feb. 6, 2024

(54) SYSTEMS AND METHODS FOR INTEGRATING, AGGREGATING AND UTILIZING DATA FROM A PLURALITY OF DATA SOURCES

(71) Applicant: United Services Automobile Association, San Antonio, TX (US)

(72) Inventors: Guy R. Langley, San Antonio, TX (US); Jason W. Lindley, Schertz, TX (US); Donald H. Griffin, Jr., Peoria, AZ (US); Elizabeth Garretson, Fair Oaks Ranch, TX (US); Ryan R. Barth, San Antonio, TX (US); Francisco A. Duran, San Antonio, TX (US); Ann C. Tarrillion, San Antonio, TX (US); David W. Roberts, Helotes, TX (US)

(73) Assignee: United Services Automobile Association, San Antonio, TX (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/687,324

(22) Filed: Mar. 4, 2022

Related U.S. Application Data

(63) Continuation of application No. 16/877,843, filed on May 19, 2020, now Pat. No. 11,301,930, which is a
(Continued)

(51) Int. Cl.
*G06Q 40/00* (2023.01)
*G06Q 40/02* (2023.01)
(Continued)

(52) U.S. Cl.
CPC ............... *G06Q 40/02* (2013.01); *G06T 11/60* (2013.01); *H04L 67/10* (2013.01)

(58) Field of Classification Search
CPC .......... G06Q 40/02; G06T 11/60; H04L 67/10
See application file for complete search history.

(56) References Cited

U.S. PATENT DOCUMENTS

| 5,774,887 A | 6/1998 | Wolff et al. |
| 7,353,182 B1 | 4/2008 | Missinhoun et al. |
| (Continued) | | |

FOREIGN PATENT DOCUMENTS

| EP | 2830011 A1 | 1/2015 |
| WO | WO-0102927 A2 | 1/2001 |
| (Continued) | | |

OTHER PUBLICATIONS

Taylor et al., "Implementation of a user-centered framework in the development of a web-based health information database and call center," Journal of Biomedical Informatics (44) (2011) 8978-908. (Year: 2011).*

(Continued)

*Primary Examiner* — Hani M Kazimi
*Assistant Examiner* — William B. Bunker
(74) *Attorney, Agent, or Firm* — Christopher J. Capelli

(57) ABSTRACT

A method of integrating electronic data including integrating a desktop such that the desktop includes information received from various sources. The information displayed may be analyzed by a business rule to prioritize what information is included in the desktop, and the information may include data from databases, recent member activities, planned future actions, and recommended future actions. The method also includes the ability to integrate and/or aggregate various data sources, such as databases. The combination of the data sources may be performed according to one or more business rules.

14 Claims, 3 Drawing Sheets

Related U.S. Application Data continuation of application No. 14/887,808, filed on Oct. 20, 2015, now Pat. No. 10,699,334.

(60) Provisional application No. 62/066,113, filed on Oct. 20, 2014.

(51) Int. Cl.
*H04L 67/10* (2022.01)
*G06T 11/60* (2006.01)

(56) References Cited

U.S. PATENT DOCUMENTS

| | | | |
|---|---|---|---|
| 7,877,304 B1 * | 1/2011 | Coulter | G06Q 40/03 705/35 |
| 8,438,132 B1 | 5/2013 | Dziuk et al. | |
| 8,660,852 B2 | 2/2014 | Law | |
| 8,909,550 B2 | 12/2014 | Biedermann et al. | |
| 9,098,312 B2 | 8/2015 | Bullota | |
| 9,832,315 B1 * | 11/2017 | Jayapalan | H04M 3/5233 |
| 2001/0056362 A1 | 12/2001 | Hanagan et al. | |
| 2002/0024537 A1 | 2/2002 | Jones et al. | |
| 2002/0066033 A1 | 5/2002 | Dobbins et al. | |
| 2002/0087385 A1 | 7/2002 | Vincent | |
| 2003/0137536 A1 | 7/2003 | Hugh | |
| 2005/0119924 A1 | 6/2005 | Simpson et al. | |
| 2005/0222931 A1 | 10/2005 | Mamou et al. | |
| 2006/0048054 A1 | 3/2006 | Honda | |
| 2006/0203294 A1 | 9/2006 | Makino | |
| 2007/0262140 A1 * | 11/2007 | Long | G06Q 20/04 235/380 |
| 2008/0240404 A1 * | 10/2008 | Conway | H04M 3/5175 379/212.01 |
| 2009/0187455 A1 | 7/2009 | Fernandes et al. | |
| 2010/0153446 A1 | 6/2010 | Kondziela | |
| 2011/0280391 A1 * | 11/2011 | Venugopal | H04M 3/523 379/266.1 |
| 2012/0078813 A1 | 3/2012 | Rose et al. | |
| 2012/0123824 A1 | 5/2012 | Patel et al. | |
| 2014/0052645 A1 | 2/2014 | Hawes et al. | |
| 2014/0074589 A1 | 3/2014 | Nielsen et al. | |
| 2014/0096239 A1 * | 4/2014 | Fergusson | H04L 67/56 726/19 |
| 2014/0348317 A1 | 11/2014 | Deepak | |
| 2015/0149623 A1 | 5/2015 | Numata | |
| 2015/0199756 A1 | 7/2015 | Staton et al. | |

FOREIGN PATENT DOCUMENTS

| | | | | |
|---|---|---|---|---|
| WO | WO-2006047595 A2 * | 5/2006 | | G06Q 10/06393 |
| WO | WO-2010096808 A2 | 8/2010 | | |
| WO | WO-2012029066 A1 * | 3/2012 | | G06Q 20/4016 |

OTHER PUBLICATIONS

Walter O. Anderson, Jr., "Customer Relationship Management in an E-Business Environment," IEEE No. 0-7803-7260 (Year: 2002).
Ajimera et al., "A CRM System for Social Media, [Challenges and Experiences]," IW3C2, WWW, 2013 (Year: 2013).

\* cited by examiner

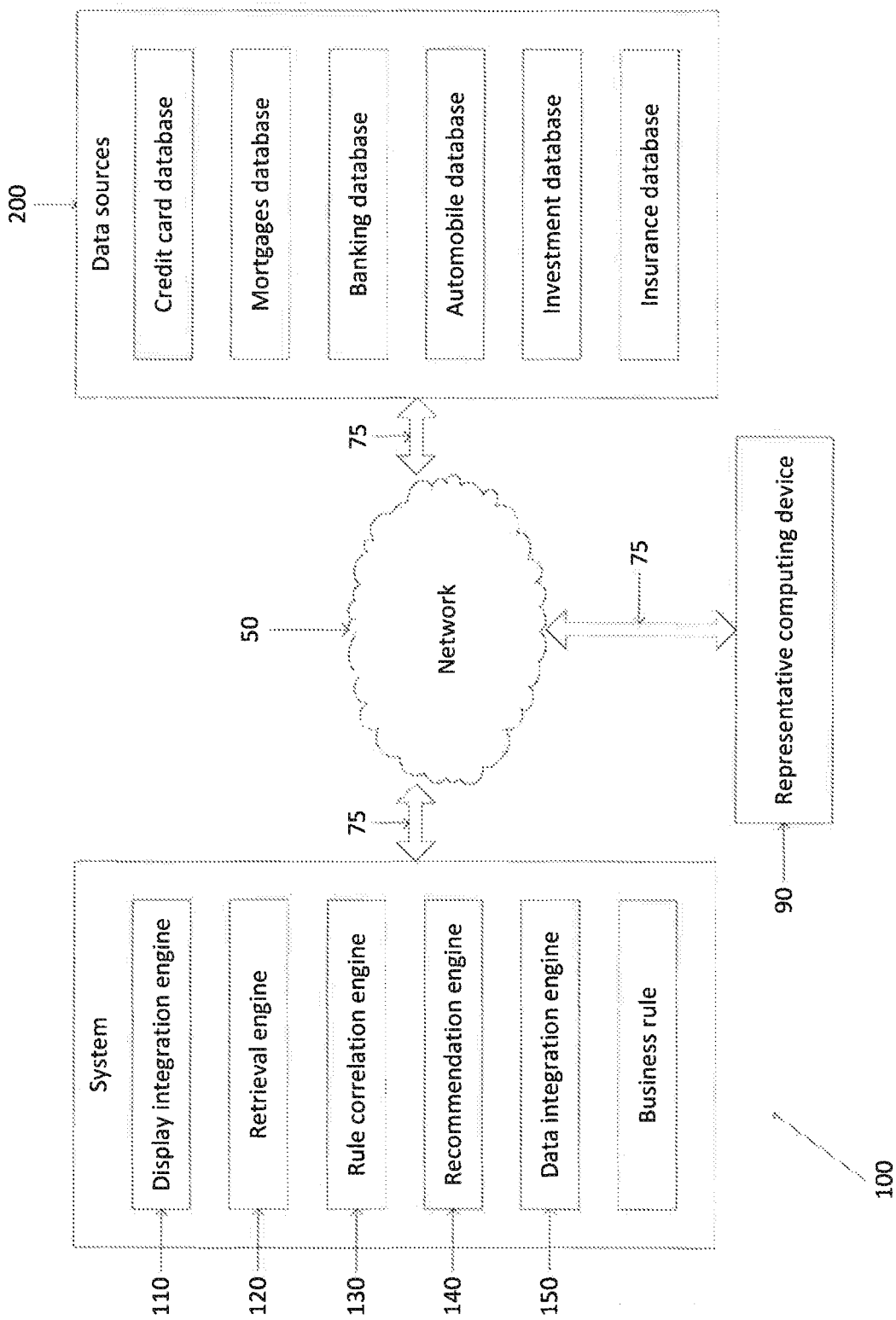

SYSTEMS AND METHODS FOR INTEGRATING, AGGREGATING AND UTILIZING DATA FROM A PLURALITY OF DATA SOURCES

CROSS REFERENCE TO RELATED APPLICATIONS

This application is a Continuation of U.S. patent application Ser. No. 16/877,843 filed May 19, 2020, which is a continuation of U.S. patent application Ser. No. 14/887,808 filed Oct. 10, 2015, which claims priority to U.S. Patent Application No. 62/066,113 filed Oct. 20, 2014, which are incorporated herein by reference in its entirety.

FIELD OF THE INVENTION

The present invention relates to integrating computer functionality, and more particularly, to integrating, aggregating and utilizing data that has been retrieved from multiple data sources.

BACKGROUND OF THE INVENTION

The exponential growth of electronic data has unfortunately not been coupled with a correlated ability to integrate and effectively utilize all of the data. Although an individual company may have access to vast stores of information about their members, the information is at best utilized inefficiently.

Accordingly, there is an unmet need to provide the ability to integrate and aggregate data from various databases, and also to provide the output of that combination to a member management representative, such as when speaking to a member to whom the data may relate.

SUMMARY OF THE INVENTION

The purpose and advantages of the below described illustrated embodiments will be set forth in and apparent from the description that follows. Additional advantages of the illustrated embodiments will be realized and attained by the devices, systems, and methods particularly pointed out in the written description and the claims herein, as well as from the drawings.

To achieve these and other advantages and in accordance with the purpose of the illustrated embodiments, in one embodiment, described herein are systems and methods for integrating various data sources and presenting the information to member service representatives. In this embodiment, an integrated desktop is displayed on a computing device utilized by a representative of a company, and the integrated desktop may include information about a member of the company. Data from a plurality of data sources is retrieved, correlated and displayed in the integrated desktop.

In another embodiment, the system identifies a first and second service that a company offers, with a member being enrolled in both services. Based on the member's enrollment in one of the services, and further based on application of a business rule, a recommendation is generated for the member to edit their selected options for one of the services (e.g., based on the member having car insurance coverage from the company, a recommendation is generated for the member to change their life insurance policy to pay double for accidental death).

In yet another embodiment, the system identifies a first service that a member is enrolled in and a second service that the member is not enrolled in. Based on the member's enrollment in the first service, and further based on application of a business rule, a recommendation is generated for the member to enroll in the company's offering of the second service (e.g., based on the member having a mortgage with the company, a recommendation is generated for the member to enroll in a home insurance policy).

BRIEF DESCRIPTION OF THE DRAWINGS

So that those having ordinary skill in the art, to which the present embodiments pertain, will more readily understand how to employ the novel system and methods, certain illustrated embodiments thereof will be described in detail herein-below with reference to the drawings, wherein:

FIG. 1 illustrates a system diagram of an exemplary embodiment of a system for combining and utilizing data retrieved from data sources;

DETAILED DESCRIPTION OF CERTAIN EMBODIMENTS

Figure 2A:
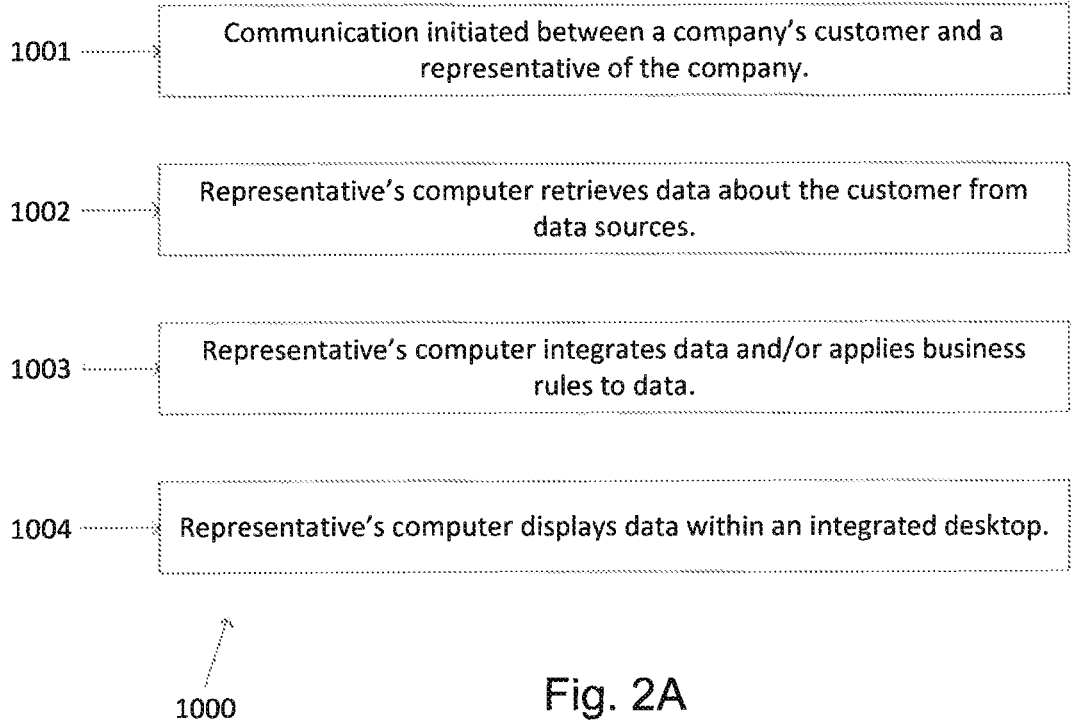
FIG. 2A is a flow chart illustrating an exemplary use of the embodiment of FIG. 1.

The below illustrated embodiments are directed to integrating, aggregating and utilizing data that has been retrieved from multiple data sources. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above.

A module, engine or like term is a functional aspect, which may include software and/or hardware. Typically, an engine encompasses the necessary components to accomplish a task. It is envisioned that the same hardware could implement a plurality of engines and portions of such hardware being available as needed to accomplish the task. One skilled in the art will appreciate further features and advantages of the certain embodiments described herein. Thus the certain embodiments are not to be understood to be limited by what has been particularly shown and described, except as indicated by the appended claims.

The methods described herein allow users to, in an exemplary use, integrate, aggregate and utilize data that has been retrieved from multiple data sources. Referring to FIG. 1, a hardware diagram depicting a system 100 in which the processes described herein can be executed is provided for exemplary purposes. In one embodiment, system 100 includes network communications 75, representative computing device 90, display integration engine 110, retrieval engine 120, rule correlation engine 130, recommendation engine 140, data integration engine 150, business rules and data sources 200. Data sources 200 includes database(s) related to at least credit card services, mortgage services, banking services, automobile loan services, investment services, insurance services and housing services. It is to be appreciated that reference and utilization of "business rules" herein is to be understood to encompass predictive models/predictive business intelligence data models.

Turning to FIG. 2A, illustrated therein is in an exemplary process 1000 of utilizing system 100. Starting at step 1001, communication is initiated between a company's member and a representative of the company. It is to be appreciated reference herein to a "member" shall also be applicable to a "customer", and similarly, reference to a member service representative shall also be applicable to a customer service representative. The representative's computer accesses, via retrieval engine 120, information, such as data from data sources 200 (step 1002). The representative's computer subsequently integrates the data, via display integration engine 110, for the computer's integrated desktop, and/or prioritizes and identifies the most relevant data, via rule correlation engine 130 (step 1003). Finally, the representative's computer displays the data within the computer's integrated desktop (step 1004).

In one exemplary use, data may be retrieved from databases related to a member's home insurance, automobile insurance and recent transactions. The data from each of the separate data sources is combined and displayed in an integrated format on the representative's computer desktop. Further, recent interactions with the member may be analyzed, according to one or more business rules, to determine which are the most relevant. For example, if the member was recently in a car accident and filed an automobile insurance claim, even if that was not the most recent activity related to the member's account, that event may be prominently displayed on the representative's computer desktop. In another example, if the member previously planned to lower the premium of their life insurance coverage because they would be retiring soon, after a certain period of time (e.g., a time period indicated by the member) that planned event would be prominently displayed on the representative's computer desktop.

Figure 2B:
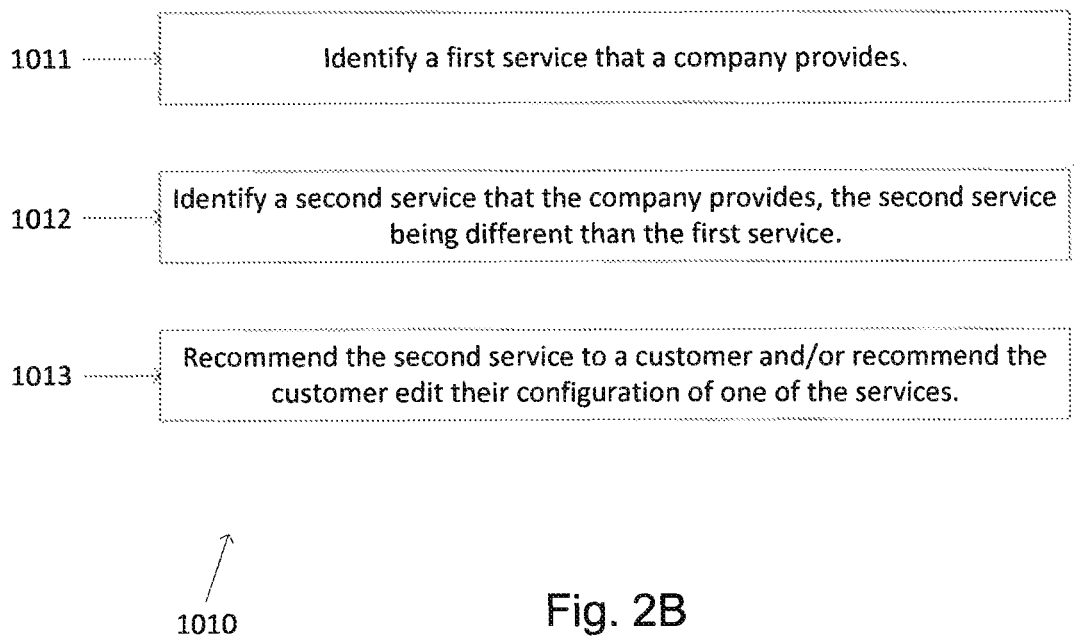
FIG. 2B is a flow chart illustrating another exemplary use of the embodiment of FIG. 1.

Turning now to FIG. 2B, illustrated therein is in another exemplary process 1010 of utilizing system 100. Initially, system 100 identifies two services that a company provides (steps 1011 and 1012). In one example, the member is only enrolled in one of the services with the company, in which case recommendation engine 140 may indicate that the member may be interested in enrolling in the second service (step 1013). For example, if the member has a mortgage with the company but no home insurance, recommendation engine 140 may suggest that the member enroll in the company's offering of home insurance. In another example, the member is enrolled with the company for both services, in which case recommendation engine 140 may indicate that the member should consider reconfiguring the selected options for one of the services, the indication being based on the member's enrollment in the other service (step 1013). For example, if the member is enrolled in an automobile insurance policy with the member, recommendation engine 140 may indicate that the member may be interested in modifying their life insurance policy to pay more money for an accidental death.

In another example, the member may be enrolled in both credit card services and banking services with the company. Given that the member is enrolled in banking services with the company, recommendation engine 140 may indicate that the member may be interested in initiating a recurring direct payment from the member's banking account to the member's credit card bill. It is contemplated herein that this direct payment may be configured such that the direct payment happens automatically, the direct payment only happens upon receiving approval from the member (e.g., a text or email that the member may provide an affirmative response to confirm this payment, a phone call), the direct payment only happens when the direct payment does not reduce the member's banking funds below a certain amount (e.g., $1,000.00), or any combination thereof.

In an exemplary use of system 100, data integration engine 150 interacts with data sources 200 to obtain data for correlation, integration, business rule application, and/or display. Data integration engine 150 may accesses two databases and combine, integrate and/or correlate the two databases to produce a single resultant database, and such combination may be performed according to one or more business rules. The resultant database may itself be combined with an additional database to produce a new resultant database, and such may be repeated.

It is contemplated herein that data sources 200 may comprise a single server, or it may be a collection of multiple servers and/or sources of data. It is also contemplated herein that engines 110 through 150 may be located on a server (best shown in FIG. 1), on a client machine (e.g., representative's computing device) or any combination thereof. Thus, for exemplary purposes only and without limitation, display integration engine may be located on a server and mere images are transferred to the representative's computing device (e.g., representative's computing device is a "thin client" and/or an "ultra-thin client").

Figure 3:
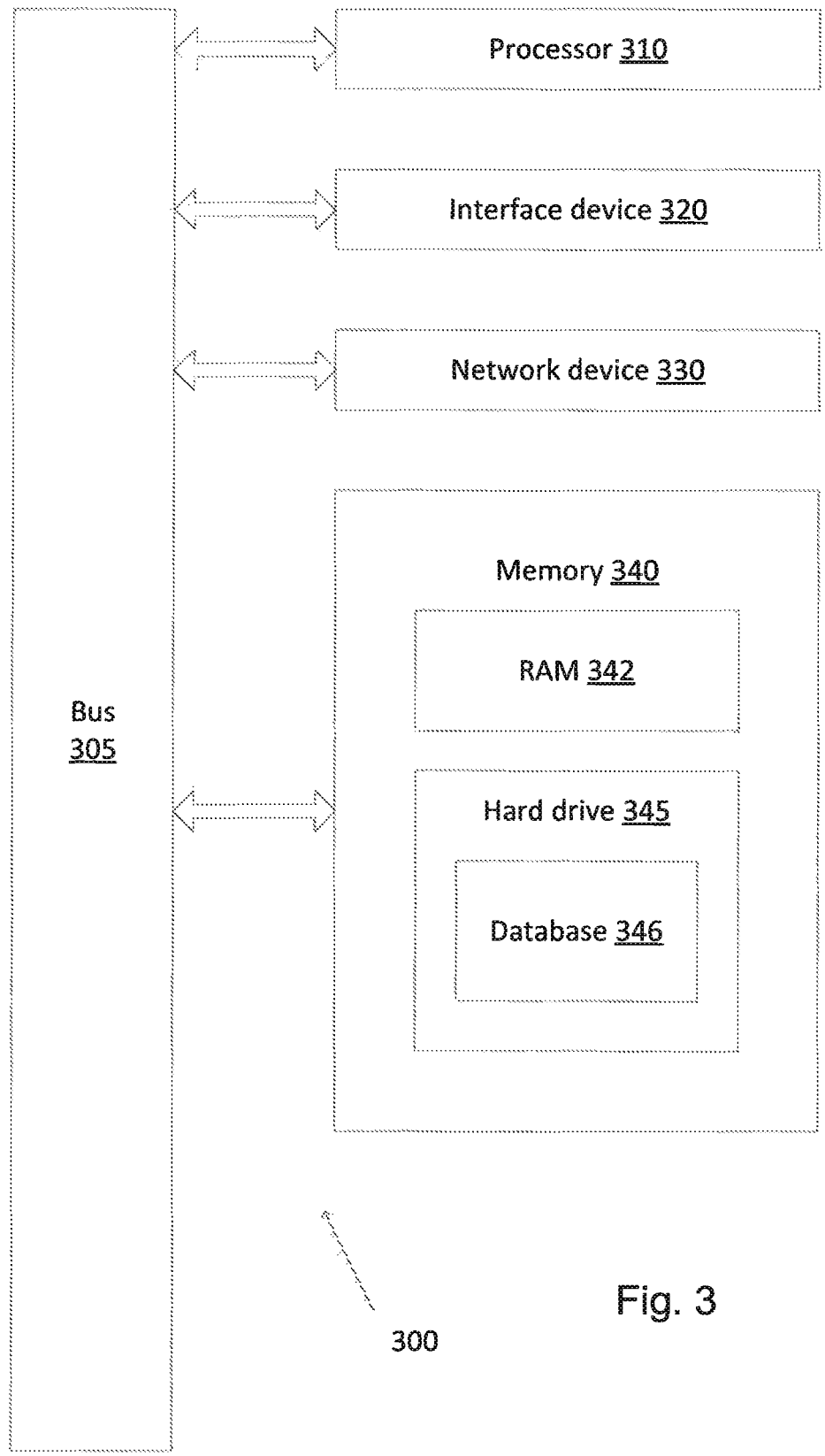
FIG. 3 is an illustration of an embodiment of a computing device.

Turning now to FIG. 3, illustrated therein is an exemplary embodiment of computing device 300 that preferably includes bus 305, over which intra-device communications preferably travel, processor 310, interface device 320, network device 330, and memory 340, which preferably includes RAM 342, hard drive 345 and database 346.

System 100 and member computing device 90 preferably include a computer and the components thereof. Further, the term "module"/"engine" is used herein to denote a functional operation that may be embodied either as a stand-alone component or as an integrated configuration of a plurality of subordinate components. Thus, display integration engine 110, retrieval engine 120, rule correlation engine 130, recommendation engine 140 and data integration engine 150 may be implemented as a single module or as a plurality of modules that operate in cooperation with one another. Moreover, although display integration engine 110, retrieval engine 120, rule correlation engine 130, recommendation engine 140 and data integration engine 150 are described herein as being implemented as software, they could be implemented in any of hardware (e.g. electronic circuitry), firmware, software, or a combination thereof.

Memory 340 is a computer-readable medium encoded with a computer program. Memory 340 stores data and instructions that are readable and executable by processor 310 for controlling the operation of processor 310. Memory 340 may be implemented in random access memory 342 (RAM), a non-transitory computer readable medium, volatile or non-volatile memory, solid state storage devices, magnetic devices, hard drive 345, a read only memory (ROM), or a combination thereof.

Processor 310 is an electronic device configured of logic circuitry that responds to and executes instructions. Processor 310 outputs results of an execution of the methods described herein. Alternatively, processor 310 could direct the output to a remote device (not shown) via network 50.

It is to be further appreciated that network 50 depicted in FIG. 1 can include a local area network (LAN) and a wide area network (WAN), other networks such as a personal area network (PAN), or any combination thereof. Such networking environments are commonplace in offices, enterprise-wide computer networks, intranets, and the Internet. For instance, when used in a LAN networking environment, system 100 is connected to the LAN through a network interface or adapter (not shown). When used in a WAN networking environment, the computing system environment typically includes network device 330 or other means for establishing communications over the WAN, such as the Internet. Network device 330, which may be internal or external, may be connected to a system bus via a user input interface, or via another appropriate mechanism. In a networked environment, program modules depicted relative to the system 100, or portions thereof, may be stored in a remote memory storage device such as storage medium. It is to be appreciated that the illustrated network connections of FIG. 1 are exemplary and other means of establishing a communications link between multiple computers may be used.

It should be understood that computing devices 300 each generally include at least one processor, at least one interface, and at least one memory device coupled via buses. Computing devices 300 may be capable of being coupled together, coupled to peripheral devices, and input/output devices. Computing devices 300 are represented in the drawings as standalone devices, but are not limited to such. Each can be coupled to other devices in a distributed processing environment.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprise", "include", and conjugations thereof are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

What is claimed is:

1. A computer implemented method for evaluating customer services offered by a company to its members comprising:
   aggregating a first database and a second database to produce a resultant database, wherein the first database and the second database relate to services offered by the company to a member, wherein the aggregation is based on a current telephonic interaction between the member and a customer representative of the company;
   storing the resultant database;
   displaying, using the resultant database, in an integrated desktop interface of a computing device of the customer representative, based on the telephonic interaction, current information about the member;
   evaluating the member's enrollment in both a first service and a second service relating to the member's subscribed services to determine a recommended change to the member's enrollment in the subscribed services based upon current member enrollment in both the first and second services and based upon the current information;
   analyzing prior interactions between the member and customer service representatives of the company to determine a most relevant interaction;
   displaying the determined most relevant interaction in the integrated desktop interface;
   retrieving additional information from a third database relative to the member's current information and aggregating the additional information with the resultant database; and
   correlating, according to a business rule, the most relevant interaction, the additional information and the recommended change to produce new correlated data in a new prioritized format; and
   displaying the new correlated data in the prioritized format in a customer representative interface, wherein the prioritized format is based at least in part on the current information received by the representative in the current interaction with the member.

2. The computer implemented method of claim 1, wherein the prioritized format comprises prominently displaying the current information.

3. The computer implemented method of claim 1, wherein planned future interactions are included in the integrated desktop and are analyzed for relevance according to the business rule.

4. The computer implemented method of claim 3, further including the steps:
   querying a plurality of data sources for information related to the member;

receiving information related to the member from querying the plurality of data sources; and applying a business rule to categorize and prioritize the received information, wherein the step of displaying the integrated desktop comprises displaying a subset of the received information according to the business rule.

5. The computer implemented method of claim 4, further including the steps:

selecting a first service selected from the group consisting of mortgage services, banking services, credit card services, automobile loan services, investment management services, insurance services and housing services, wherein the member is enrolled in the company's offering of the first service;

selecting a second service selected from the group consisting of mortgage services, banking services, credit card services, automobile loan services, investment management services, insurance services and housing services, wherein the second service is different than the first service, and wherein the member is not enrolled in the company's offering of the second service; and recommending the member enroll in the second service with the company based on the member's enrollment in the company's offering of the first service.

6. The computer implemented method of claim 4, further including the steps:

selecting a first service selected from the group consisting of mortgage services, banking services, credit card services, automobile loan services, investment management services, insurance services and housing services, wherein the member is enrolled in the company's offering of the first service; and selecting a second service selected from the group consisting of mortgage services, banking services, credit card services, automobile loan services, investment management services, insurance services and housing services, wherein the first service is different than the second service, and wherein the member is enrolled in the company's offering of the second service.

7. The computer implemented method of claim 6, further including the step: recommending the member approve a change of a setting to the member's enrollment in the first service based on the member's enrollment in the company's offering of the second service.

8. A computer system for evaluating customer services offered by a company to its members, comprising:

a memory configured to store instructions;

a processor disposed in communication with the memory, wherein said processor upon execution of the instructions is configured to:

aggregating a first database and a second database to produce a resultant database, wherein the first and the second database relates to services offered by the company to a member, wherein the aggregation is based on a current telephonic interaction between the member and a customer representative of the company;

storing the resultant database;

displaying, using the resultant database, in an integrated desktop interface of a computing device of the customer representative, based on the telephonic interaction, current information about the member;

evaluating the member's enrollment in both a first service and a second service relating to the member's subscribed services to determine a recommended change to the member's enrollment in the subscribed services based upon current member enrollment in both the first and second services and based upon the current information;

analyzing prior interactions between the member and customer service representatives of the company to determine a most relevant interaction;

displaying the determined most relevant interaction in the integrated desktop interface;

retrieving additional information from a third database relative to the member's current information and aggregating the additional information with the resultant database; and correlating, according to a business rule, the most relevant interaction, the additional information and the recommended change to produce new correlated data in a new prioritized format; and displaying the new correlated data in the prioritized format in a customer representative interface, wherein the prioritized format is based at least in part on the current information received by the representative in the current interaction with the member.

9. The computer system of claim 7, wherein the prioritized format comprises prominently displaying the current information.

10. The computer system of claim 8, wherein planned future interactions are included in the integrated desktop and are analyzed for relevance according to the business rule.

11. The computer system of claim 10, wherein the processor is further configured to:

query a plurality of data sources for information related to the member;

receive information related to the member from querying the plurality of data sources; and apply a business rule to categorize and prioritize the received information, wherein the step of displaying the integrated desktop comprises displaying a subset of the received information according to the business rule.

12. The computer system of claim 11, wherein the processor is further configured to:

select a first service selected from the group consisting of mortgage services, banking services, credit card services, automobile loan services, investment management services, insurance services and housing services, wherein the member is enrolled in the company's offering of the first service;

select a second service selected from the group consisting of mortgage services, banking services, credit card services, automobile loan services, investment management services, insurance services and housing services, wherein the second service is different than the first service, and wherein the member is not enrolled in the company's offering of the second service; and recommend the member enroll in the second service with the company based on the member's enrollment in the company's offering of the first service.

13. The computer system of claim 11, wherein the processor is further configured to:

select a first service selected from the group consisting of mortgage services, banking services, credit card services, automobile loan services, investment management services, insurance services and housing services, wherein the member is enrolled in the company's offering of the first service; and select a second service selected from the group consisting of mortgage services, banking services, credit card services, automobile loan services, investment management services, insurance services and housing services, wherein the first service is different than the second service, and wherein the member is enrolled in the company's offering of the second service.

14. The computer system of claim 13, wherein the processor is further configured to: recommend the member approve a change of a setting to the member's enrollment in the first service based on the member's enrollment in the company's offering of the second service.

\* \* \* \* \*